Patented Apr. 18, 1944

2,346,772

UNITED STATES PATENT OFFICE 2,346,772

PROCESS FOR THE MANUFACTURE OF 5-CHLORO-QUINIZARIN

Ralph N. Lulek, Wilmington, Del., and Edwin C. Buxbaum, Media, Pa., assignors to E. I. du Pont de Nemours & Company, Wilmington, Del., a corporation of Delaware No Drawing. Application July 25, 1942, Serial No. 452,366

2 Claims. (Cl. 260—383)

This invention relates to an improved process for the manufacture of 1,4-dihydroxy-5-chloroanthraquinone (5-chloro-quinizarin) and has for its object to provide a simple and economical process for preparing this dye intermediate in substantially pure form and in good yields whereby it may be made available at a cost that will permit its use in the commercial preparation of dyes and similar compounds.

The only method heretofore disclosed in the literature for the preparation of 5-chloroquinizarin is that described by Waldman, Jour. Prakt. Chemie (2) 130, pages 92–102, 1931, and patented in German Patent 172,105. According to this process 3-chloro-phthalic anhydride is condensed with hydroquinone and ring closed to 5-chloro-quinizarin. The 3-chloro-phthalic anhydride is prepared by the nitration of phthalic anhydride which results in a mixture of the 3-nitro and 4-nitro isomers. The 3-nitrophthalic anhydride is present in the mixture to an extent of only approximately 30% and when separated it is in a very impure form that requires extensive recrystallizations to obtain it in the necessary purity for use in the manufacture of dyes. The 3-nitro derivative is then converted to the 3-chloro-phthalic anhydride by chlorinating. This process is too involved and expensive to permit the extensive use of this intermediate in the commercial manufacture of dyes and other compounds where 5-chloro-quinizarin might be of value.

We have found that 1-nitro-5-chloroanthraquinone can be converted readily and economically into 5-chloro-quinizarin by heating the 1-nitro-5-chloroanthraquinone with sodium nitrite in sulfuric acid and in the presence of boric acid at temperatures of around 200° C. Conversion to the 5-chloro-quinizarin proceeds smoothly. The product is isolated by drowning the reaction mix in water, boiling for a short time and filtering off the orange colored precipitate. This product may be prepared in the same manner starting with 1-amino-5-chloroanthraquinone but since this is a somewhat more expensive intermediate than the 1-nitro-5-chloroanthraquinone and there is no other advantage in its use, the 1-nitro-5-chloroanthraquinone is preferred for conversion by our process to the 5-chloro-quinizarin.

The following examples are given to illustrate the invention. The parts used are by weight.

Example 1

Twenty-five parts of sodium nitrite are added over a period of one hour, holding the temperature at 25–30° C., to 1000 parts of 98% sulfuric acid. There is then added to this solution while it is agitated, a previously prepared mixture of 40 parts of boric acid and 50 parts of 1-nitro-5-chloroanthraquinone. The reaction mass is then heated under agitation to 200°–210° C. over a period of two hours and held at this temperature for twelve hours. It is then allowed to cool to 30°–40° C. and poured slowly into 6000 parts of ice and water. The acid suspension is then heated to the boil and boiled for 30 minutes. It is filtered hot, washed acid-free with hot water and dried. The resulting product is a reddish-orange powder identical with the 5-chloro-quinizarin described by Waldman in Jour. Prakt. Chem. (2) 130, 92–102, 1931.

Example 2

Forty parts of sodium nitrite are added to 1000 parts of 98% sulfuric acid under good agitation over a period of two hours while maintaining the temperature of the solution at 25–30° C. When the sodium nitrite is entirely dissolved, there is then slowly added to the solution, over a period of one-half hour, a previously prepared mixture of 40 parts of boric acid and 50 parts of 1-amino-5-chloroanthraquinone. The reaction mass is then brought to a temperature of 200°–210° C. over a period of two hours and held at this temperature for 16 hours. The isolation of the product from the acid reaction mixture is conducted as in Example 1. The compound is identical with that obtained in Example 1.

The process as illustrated in the above examples is a simple and economical process, giving the 5-chloro-quinizarin in pure form from a readily available and relatively inexpensive anthraquinone intermediate. That the 5-chloroquinizarin could be obtained in this manner is surprising in view of the fact that it is known that the chlorine in the alpha position on the anthraquinone molecule is usually replaced by hydroxyl groups under the conditions employed in the present reaction. No reason can be advanced why the chlorine in the 5-position should be rendered more stable to replacement because of the presence of a nitro or amino in the 1-position for it is also known that the bromine in the 4-position in the 1-amino-2,4-dibromoanthraquinone can be replaced by the hydroxyl group under conditions even more mild than those employed in the present process.

5-chloro-quinizarin has heretofore been of no practical value in the commercial manufacture of dyes because of the expense involved in its preparation. The present process therefore makes this intermediate available for the commercial manufacture of dyes, thereby opening up new fields in the manufacture of dyes of the anthraquinone series.

Sulfuric acid of from 93% strength to 10% oleum can be employed in this process in place of the 98% acid specified in the specific examples. The temperature at which the reaction may be carried out may vary from 150° C. to 220° C., depending upon the strength of the acid employed. The time required to complete the reaction may also be varied from 6 to 24 hours, depending upon the temperature at which the reaction is carried out and the strength of the acid employed. Nitrosyl sulfuric acid may be used in place of the sodium nitrite in this reaction.

We claim:

1. The process for preparing 5-chloro-quinizarin which comprises heating a compound of the group consisting of 1-nitro-5-chloroanthraquinone and 1-amino-5-chloroanthraquinone in sulfuric acid in the presence of boric acid and sodium nitrite at temperatures of from 150° to 220° C., and isolating the resulting 5-chloro-quinizarin.

2. The process for preparing 5-chloro-quinizarin which comprises heating 1-nitro-5-chloroanthraquinone in sulfuric acid in the presence of boric acid and sodium nitrite at temperatures of from 150° to 220° C., and isolating the resulting 5-chloro-quinizarin.

RALPH N. LULEK.
EDWIN C. BUXBAUM.